L. J. WALKER.
RAKE.
APPLICATION FILED AUG. 23, 1920.
1,362,065.
Patented Dec. 14, 1920.
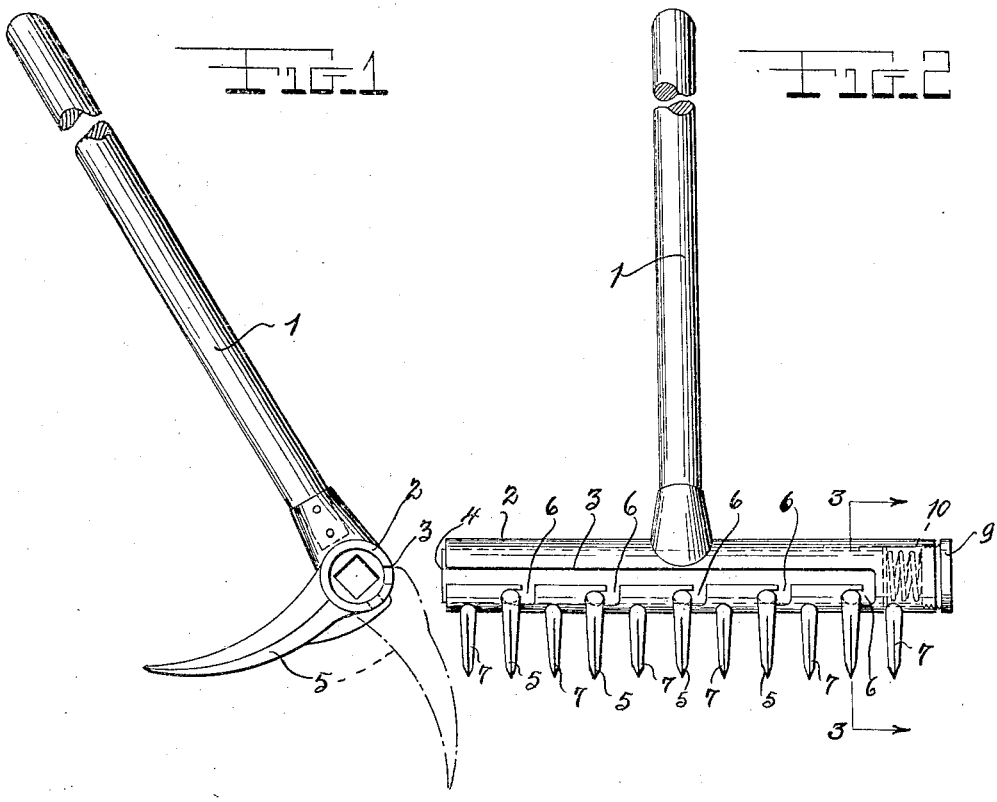
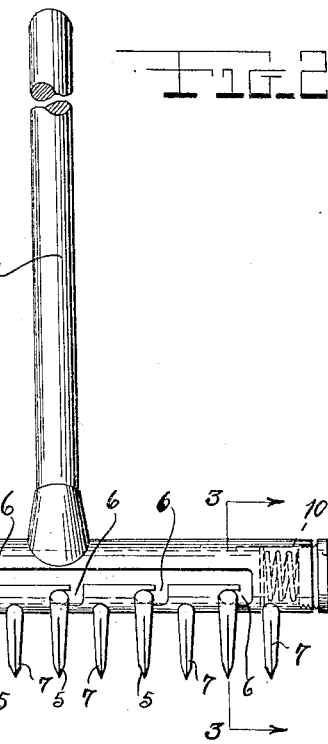
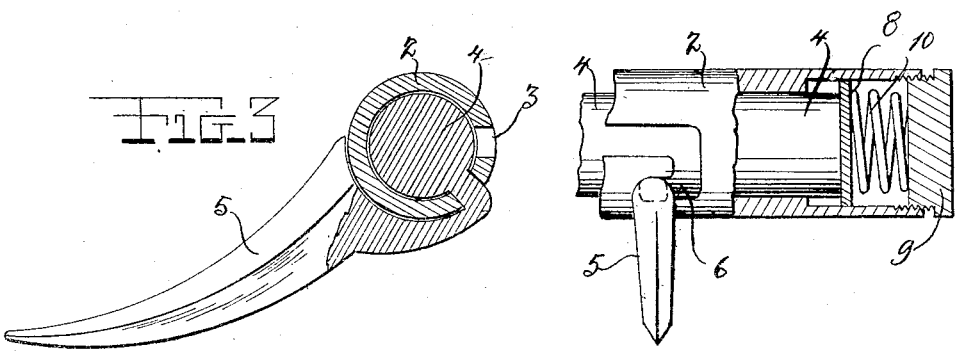
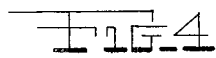
INVENTOR
L. J. Walker
BY
ATTORNEYS

UNITED STATES PATENT OFFICE.

LUTHER J. WALKER, OF HELENA, MONTANA.

RAKE.

1,362,065. Specification of Letters Patent. Patented Dec. 14, 1920.

Application filed August 23, 1920. Serial No. 405,425.

*To all whom it may concern:*

Be it known that I, LUTHER J. WALKER, citizen of the United States, and resident of Helena, in the county of Lewis and Clark and State of Montana, have invented certain new and useful Improvements in Rakes, of which the following is a specification.

The main object of this invention is to provide a rake suitable for effectively gathering small stones and rocks varying in size up to about six inches in diameter.

By my novel design and construction I believe that my rake possesses features which rank it superior to the common type of garden or lawn rake for similar purposes. My rake is particularly suitable for use on freshly plowed soil.

The above and other objects of my invention will become apparent in the description below, in which characters of reference refer to like-named parts in the drawings.

Referring briefly to the drawings, Figure 1 is a side view of my device.

Fig. 2 is a front view of the same.

Fig. 3 is a cross-sectional view on the line 3—3 of Fig. 2.

Fig. 4 is an enlarged fragmentary view of one end of the rake frame, partly in section.

Referring now in detail to the drawings, the numeral 1 represents the handle of my rake, and 2 the frame thereof attached in the usual manner. Said frame 2 is substantially cylindrical in form and is provided with a longitudinal slot 3 having a plurality of relatively smaller bayonet slots 6 communicating with said slot 3. A piston-like drum 4 lies within said frame, and is provided with a plurality of teeth 5 projecting therefrom as shown. Said teeth are of the triangular form shown.

Rigid to the frame 2 and extending outward therefrom, are a row of teeth 7 of similar construction. The drum 4 terminates within the casing 3 in a head 8, and between said head and the end of the frame lies a spring 10 normally urging said drum toward the left. A cap 9 is screwed upon the right end of the frame, and may be removed for access to the spring 10.

With the teeth in position as shown in Fig. 2 the rake may be used for gathering very small stones. When it is desired to use the rake for gathering larger stones, the left end of the drum is pressed toward the right until the teeth 5 are clear of the bend in the slots 6, then the drum is given a slight turn upward, and when the teeth 5 then enter the slot 3, the force of the spring 10 will again move the drum a short distance to the left, so that the teeth 5 will again occupy relatively the same longitudinal position as they did when in the slots 6. Thus, by this operation, the number of effective teeth has been cut in half, and the distance between successive teeth doubled. Therefore the rake will collect the larger stones and leave the smaller behind. This is of particular value when it is desired to select the larger from the smaller stones for use as building material, or for any other purpose.

I claim:

A device of the class described comprising a handle, a frame attached thereto, said frame being of substantially cylindrical shape, a plurality of teeth extending from said frame, a longitudinal slot in said frame, a plurality of bayonet slots in said frame communicating with said longitudinal slot, a drum within said frame, a plurality of teeth extending from said drum, resilient means within said frame urging said drum to one side thereof, said second-named teeth adapted to be releasably engaged in said bayonet slots.

Signed at Helena, in the county of Lewis and Clark and State of Montana this 21st day of July A. D. 1920.

LUTHER J. WALKER.